United States Patent
Farooq et al.

(10) Patent No.: US 12,187,210 B2
(45) Date of Patent: Jan. 7, 2025

(54) BUMPER-MOUNTED INFLATABLE DEVICE

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 17/742,623

(22) Filed: May 12, 2022

(65) Prior Publication Data
US 2023/0365085 A1    Nov. 16, 2023

(51) Int. Cl.
*B60R 21/20* (2011.01)
*B60R 19/20* (2006.01)
*B60R 21/36* (2011.01)

(52) U.S. Cl.
CPC ............ *B60R 19/205* (2013.01); *B60R 21/36* (2013.01)

(58) Field of Classification Search
None
See application file for complete search history.

(56) References Cited

U.S. PATENT DOCUMENTS

| | | | |
|---|---|---|---|
| 6,923,483 B2 | 8/2005 | Curry et al. | |
| 7,036,844 B2 | 5/2006 | Hammer et al. | |
| 7,073,619 B2 * | 7/2006 | Alexander | B60R 21/36 |
| | | | 180/274 |
| 7,185,728 B2 * | 3/2007 | Makita | B60R 19/205 |
| | | | 180/274 |
| 8,141,918 B2 | 3/2012 | Miller et al. | |
| 8,408,350 B2 | 4/2013 | Wilmot et al. | |
| 9,120,444 B2 * | 9/2015 | Chung | B60R 19/205 |
| 10,953,844 B2 | 3/2021 | Farooq et al. | |
| 2005/0046226 A1 * | 3/2005 | White | B60R 19/18 |
| | | | 296/102 |
| 2005/0269805 A1 | 12/2005 | Kaliske et al. | |
| 2008/0114516 A1 * | 5/2008 | Jackson | B60R 21/0428 |
| | | | 280/736 |
| 2012/0267183 A1 | 10/2012 | Wilmot et al. | |

FOREIGN PATENT DOCUMENTS

| | | |
|---|---|---|
| JP | 2006256485 A | 9/2006 |
| JP | 2006264388 A | 10/2006 |
| JP | 5186942 B2 | 4/2013 |

\* cited by examiner

*Primary Examiner* — Joseph D. Pape
(74) *Attorney, Agent, or Firm* — Frank A MacKenzie; Bejin Bieneman PLC

(57) ABSTRACT

A bumper assembly of a vehicle includes a vehicle bumper and a first inflatable device supported by the bumper. The first inflatable device is deployable downwardly from the bumper from an undeployed position to a deployed position. A second inflatable device is supported by the bumper and spaced cross-vehicle from the first inflatable device. The second inflatable device is deployable downwardly from the bumper from an undeployed position to a deployed position. An uninflatable panel is below the bumper 12 and extends from the first inflatable device to the second inflatable device in the deployed position.

20 Claims, 11 Drawing Sheets

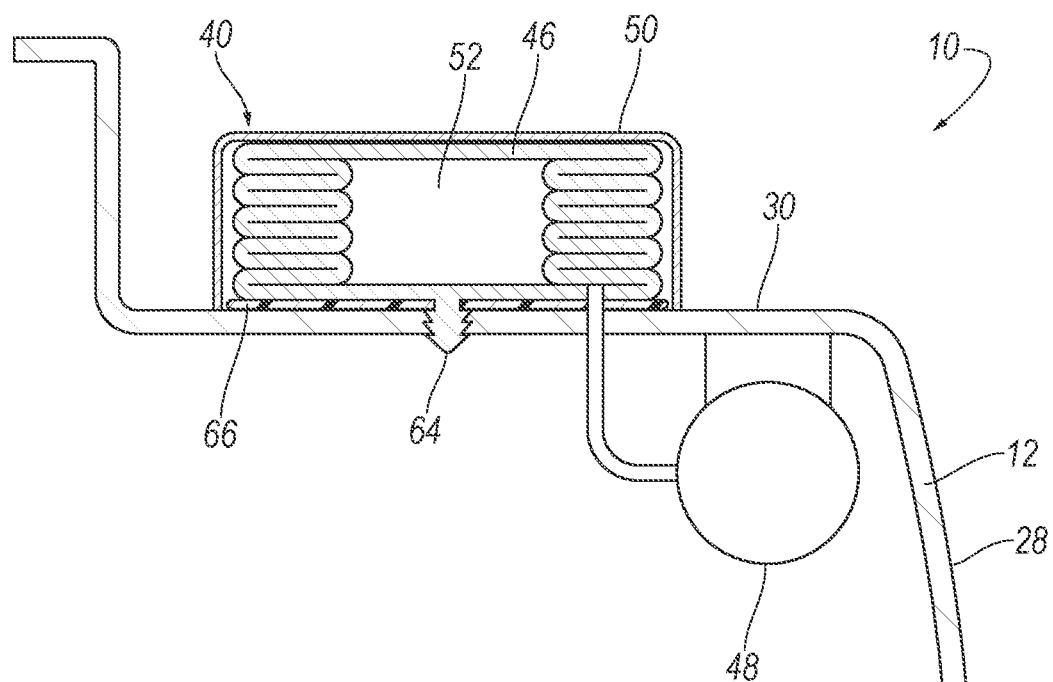
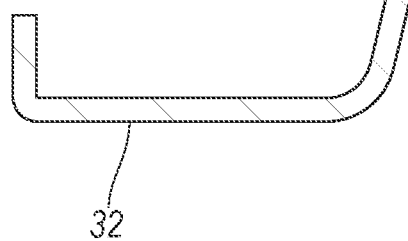

BUMPER-MOUNTED INFLATABLE DEVICE

BACKGROUND

The Global Technology Regulation (GTR) and the New Car Assessment Program (NCAP) in Europe and Japan specify leg-injury criteria for pedestrian protection. The regulations are aimed at preventing the legs of pedestrians from sliding under a vehicle bumper during a vehicle-pedestrian impact.

Some vehicles, for example light duty trucks and sport utility vehicles (SUVs), have a relatively high bumper height to provide ground clearance to allow the vehicles clear speed bumps, curbs, parking blocks, inclined driveway ramps, hills, rough roads, etc. In addition, the vehicles may also have off-road capabilities where obstacles can preclude having any components below the bumper. On the other hand, the relatively high bumper heights could allow the legs of pedestrians to bend and slide under the bumper.

BRIEF DESCRIPTION OF THE DRAWINGS

FIG. 4A is a cross-sectional view of the bumper assembly with an upper inflatable device in the undeployed position.

DETAILED DESCRIPTION

Figure 1:
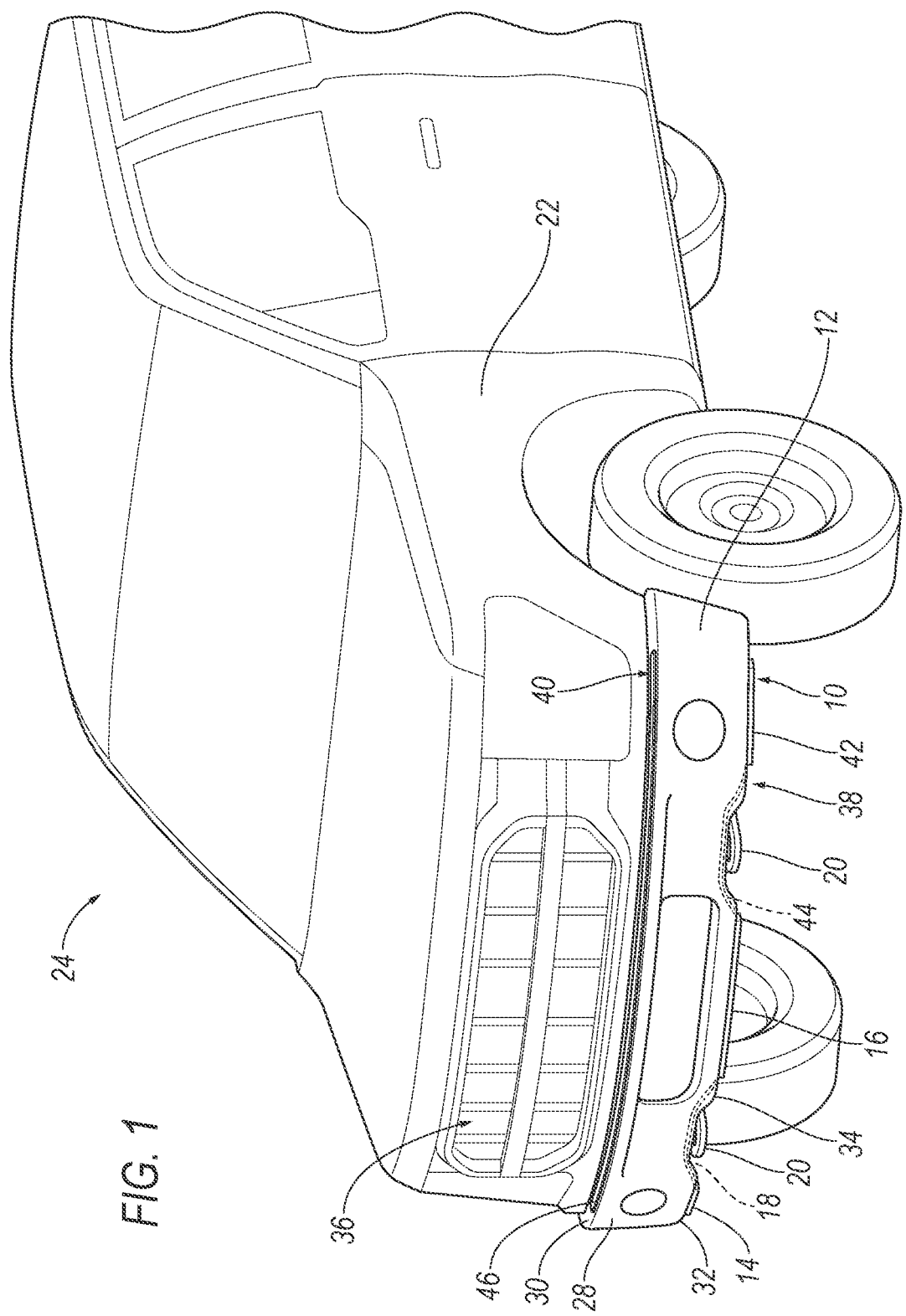
FIG. 1 is a perspective view of a vehicle with a bumper assembly including inflatable devices each in an undeployed position.

A bumper assembly includes a vehicle bumper. A first inflatable device is supported by the bumper and inflatable downwardly from the bumper from an undeployed position to a deployed position. The first inflatable device defines an inflation chamber and is a thermoplastic elastomer. A second inflatable device is supported by the bumper and is spaced cross-vehicle from the first inflatable device. The second inflatable device is inflatable downwardly from the bumper from an undeployed position to a deployed position. The second inflatable device defines an inflation chamber and is a thermoplastic elastomer. An uninflatable panel is below the bumper and extends from the first inflatable device to the second inflatable device in the deployed positions.

The bumper assembly may include an upper inflatable device supported by the bumper. The upper inflatable device defines an inflation chamber and is a thermoplastic elastomer. The upper inflatable device may be inflatable upwardly from the bumper from an undeployed position to a deployed position. The bumper assembly may include an inflator fluidly connected to the first inflatable device, the second inflatable device, and the upper inflatable device. The bumper has a top surface and a bottom surface and the first inflatable device and the second inflatable device may inflate downwardly from the bottom surface and the upper inflatable device may inflate upwardly from the top surface. The first inflatable device and the second inflatable device may be underneath the upper inflatable device when the first inflatable device, the second inflatable device, and the upper inflatable device are in deployed positions. The bumper has a front face and the first inflatable device, the second inflatable device, and the upper inflatable device may each have a front face horizontally aligned with the front face of the bumper in the deployed position.

The uninflatable panel may extend in the cross-vehicle direction from the first inflatable device to the second inflatable device when the first inflatable device and the second inflatable device are in the deployed position.

The bumper includes a bottom surface and the first inflatable device and the second inflatable device may be inflatable downwardly from the bottom surface.

The bumper assembly may include a cover supported by the bumper and the first inflatable device, the second inflatable device, and the uninflatable panel may be between the cover and the bumper in the undeployed position.

The bumper assembly may include an inflator fluidly connected to the first inflatable device and the second inflatable device.

The uninflatable panel may be connected to the first inflatable device and the second inflatable device.

The bumper assembly may include a third inflatable device supported by the bumper spaced cross-vehicle from the first inflatable device and the second inflatable device and the third inflatable device may be inflatable downwardly from the bumper from an undeployed position to a deployed position. The bumper assembly may include a second uninflatable panel below the bumper and extending from the second inflatable device to the third inflatable device in the deployed positions, the second inflatable device being between the first inflatable device and the third inflatable device. The bumper may include two tow-hook recesses, the uninflatable panel being deployable across one of the tow-hook recesses to the deployed position and the second uninflatable panel being deployable across the other tow hook recess to the deployed position. The second inflatable device may be on a lateral midline of the bumper, one of the tow-hook recesses may be between the first inflatable device and the second inflatable device, and the other of the tow-hook recesses may be between the third inflatable device and the second inflatable device.

The uninflatable panel may be connected to the bumper in undeployed position.

The bumper may include a tow hook recess, the uninflatable panel being deployable at across the tow hook recess to the deployed position.

With reference to the Figures, wherein like numerals indicate like parts throughout the several views, a bumper assembly 10 of a vehicle 24 includes a vehicle bumper 12 (hereinafter referred to as "bumper 12") and a first inflatable device 14 supported by the bumper 12. The first inflatable device 14 is deployable downwardly from the bumper 12 from an undeployed position to a deployed position. A second inflatable device 16 is supported by the bumper 12 and spaced cross-vehicle from the first inflatable device 14. The second inflatable device 16 is deployable downwardly from the bumper 12 from an undeployed position to a deployed position. An uninflatable panel 18 is below the bumper 12 and extends from the first inflatable device 14 to the second inflatable device 16 in the deployed position.

When deployed, the first inflatable device 14, the second inflatable device 16, and the uninflatable panel 18 control the kinematics of a pedestrian in the event of a front-end pedestrian impact. Specifically, in the event of a front-end pedestrian impact, since the first inflatable device 14, the second inflatable device 16, and the uninflatable panel 18 deploy downwardly from the bumper 12 in the deployed position, the first inflatable device 14, the second inflatable device 16, and/or the uninflatable panel 18 contacts a leg of the pedestrian to distribute loading of force across the leg, e.g., to distribute loading vertically. Specifically, the first inflatable device 14, the second inflatable device 16, and/or the uninflatable panel 18 may reduce relative movement between the femur and the tibia of the leg. Also, since the first inflatable device 14, the second inflatable device 16, and the uninflatable panel 18 deploy downwardly from the bumper 12, the inflatable devices 14, 16 in the undeployed position provides ground clearance below the bumper 12. The uninflatable panel 18 alleviates packaging constraints while also completing the cross-vehicle coverage for pedestrian impact. As one example, as described further below, the uninflatable panel 18 may be packaged around a tow hook 20. The first inflatable device 14 the second inflatable device 16 being a thermoplastic elastomer aids in the deployment characteristics and the shape and size of the inflatable device 14, 16 in the deployed position. The first inflatable device 14 and the second inflatable device 16 being a thermoplastic elastomer may aid in packaging of the first inflatable device 14 and the second inflatable device 16, as described further below.

With reference to FIG. 1, the vehicle 24 may be any suitable type of automobile, e.g., a passenger or commercial automobile such as a sedan, a coupe, a truck, a sport utility vehicle, a crossover vehicle, a van, a minivan, a taxi, a bus, etc. The vehicle 24, as an example, may have a relatively high ride height.

The vehicle 24 defines a vehicle-longitudinal axis L extending between a front end (not numbered) and a rear-end (not numbered) of the vehicle 24. The vehicle 24 defines a vehicle-lateral axis A extending from one side to the other side of the vehicle 24. The vehicle 24 defines a vertical axis V extending between a top (not numbered) and a bottom (not numbered) of the vehicle 24. The vehicle-longitudinal axis L, the vehicle-lateral axis A, and the vertical axis V are perpendicular relative to each other.

The vehicle 24 includes a vehicle frame 58 and a vehicle body 22. The vehicle body 22 and the vehicle frame 58 may have a body-on-frame construction (also referred to as a cab-on-frame construction) in which the body and frame are separate components, i.e., are modular, and the body is supported on and connected to the frame. In the example shown in the Figures, the vehicle 24 has a body-on-frame construction. As another example, the vehicle body 22 and the vehicle frame 58 may be of a unibody construction in which the vehicle frame 58 is unitary with the vehicle body 22 (including frame rails 26, pillars, roof rails, etc.). Alternatively, the frame and body may have any suitable construction. The frame and body may be of any suitable material, for example, steel, aluminum, and/or fiber-reinforced plastic, etc.

The vehicle frame 58 may include frame rails 26 that are elongated along the vehicle-longitudinal axis L. The frame rails 26 extend to the front end of the vehicle 24 and may extend from the front end of the vehicle 24 to the rear end of the vehicle 24. The frame rails 26 may be components of a body-on-frame construction, as described above, and in such an example the vehicle body 22 is supported on and connected to the frame rails 26, e.g., with cab-mount brackets. The frame rails 26 may, for example, include energy absorbers (not numbered) configured to absorb energy during a vehicle-to-vehicle 24 impact. For example, the frame rails 26 may include crush-initiators, crush cans, crush zones, etc. The frame rail 26 may be of any suitable material such as metal (steel, aluminum, etc.), fiber-reinforced plastic, etc.

The bumper assembly 10 is supported by the vehicle frame 58. In the example shown in the Figures, the bumper assembly 10 is supported by the frame rails 26. In other words, the weight of the bumper assembly 10 is borne by the frame rails 26. Specifically, the bumper 12 may be elongated from one frame rail 26 to the other frame rail 26. The bumper 12 may be elongated along the vehicle-lateral axis A. The bumper 12 is connected to the frame rails 26, i.e., directly connected to the frame rails 26 or indirectly connected to the frame rails 26 through an intermediate component such as a bracket, fastener components, etc. As an example, the bumper 12 may be connected to the frame rail 26 by fastener, welding, etc. As set forth above, in some examples the frame rails 26 may include energy absorbers and in examples in which the energy absorbers are on front ends of the frame rails 26, the bumper 12 may be directly connected to the energy absorbers.

The bumper 12 may have a class-A surface, i.e., a surface specifically manufactured to have a high-quality, finished aesthetic appearance free of blemishes. The class-A surface faces vehicle-forward. As an example, the class-A surface may be chromed or have a chrome-like appearance. The bumper 12 may be any suitable material, e.g., metal such as steel, aluminum, etc.; plastic such as fiber-reinforced plastic, etc.

The bumper 12 has a front face 28 that faces vehicle-forward. The front face 28 is upright and may be generally vertical. The bumper 12 may have a top surface 30 and a bottom surface 32 with the front face 28 between the top surface 30 and the bottom surface 32. The top surface 30 is spaced vertically from the bottom surface 32. The top surface 30 is above the front face 28 and the bottom surface 32 is below the front face 28. The top surface 30 and the bottom surface 32 may both extend vehicle-rearward from the front face 28.

Figure 2:
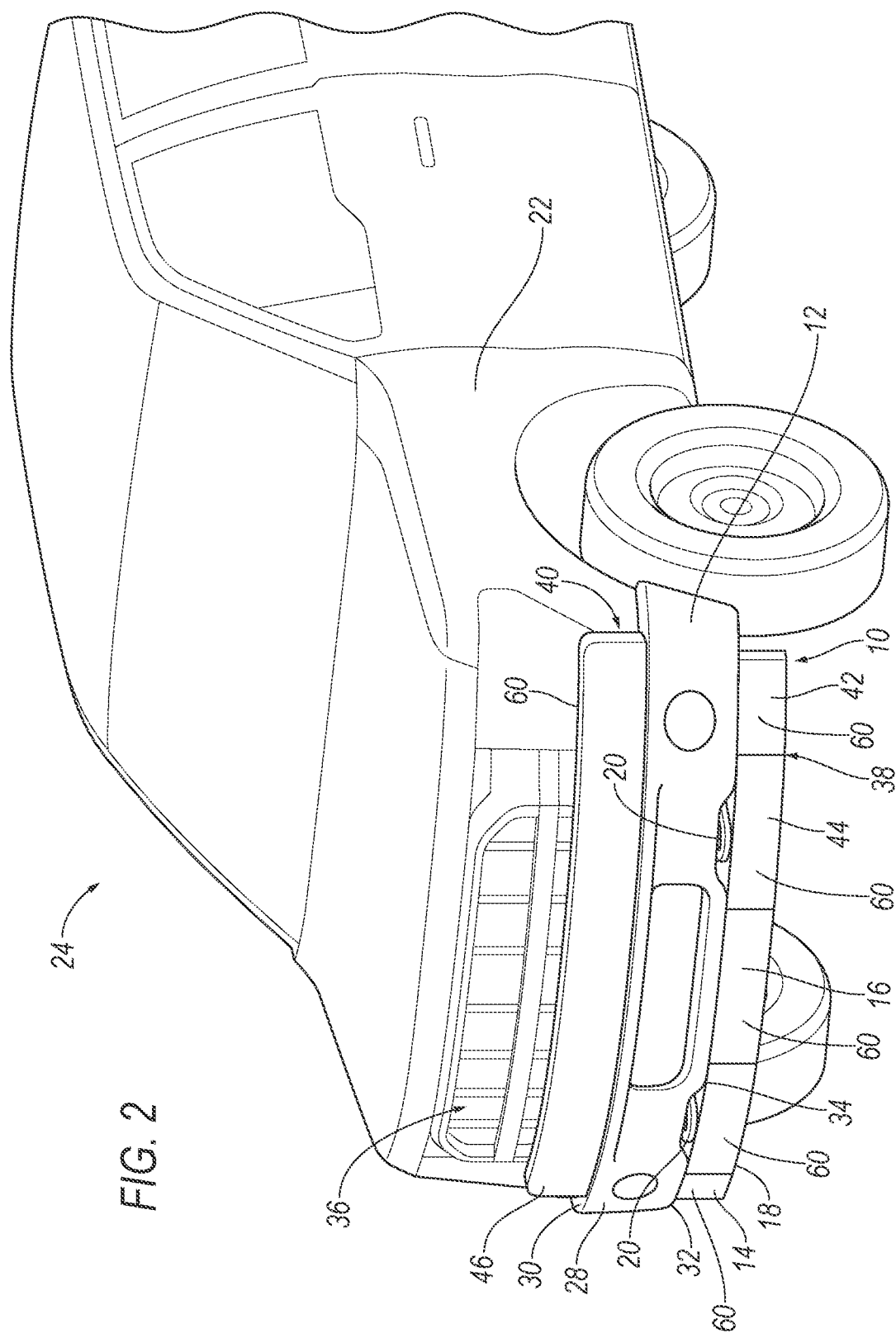
FIG. 2 is a perspective view of the vehicle with the inflatable devices each in a deployed position.
Figure 3:
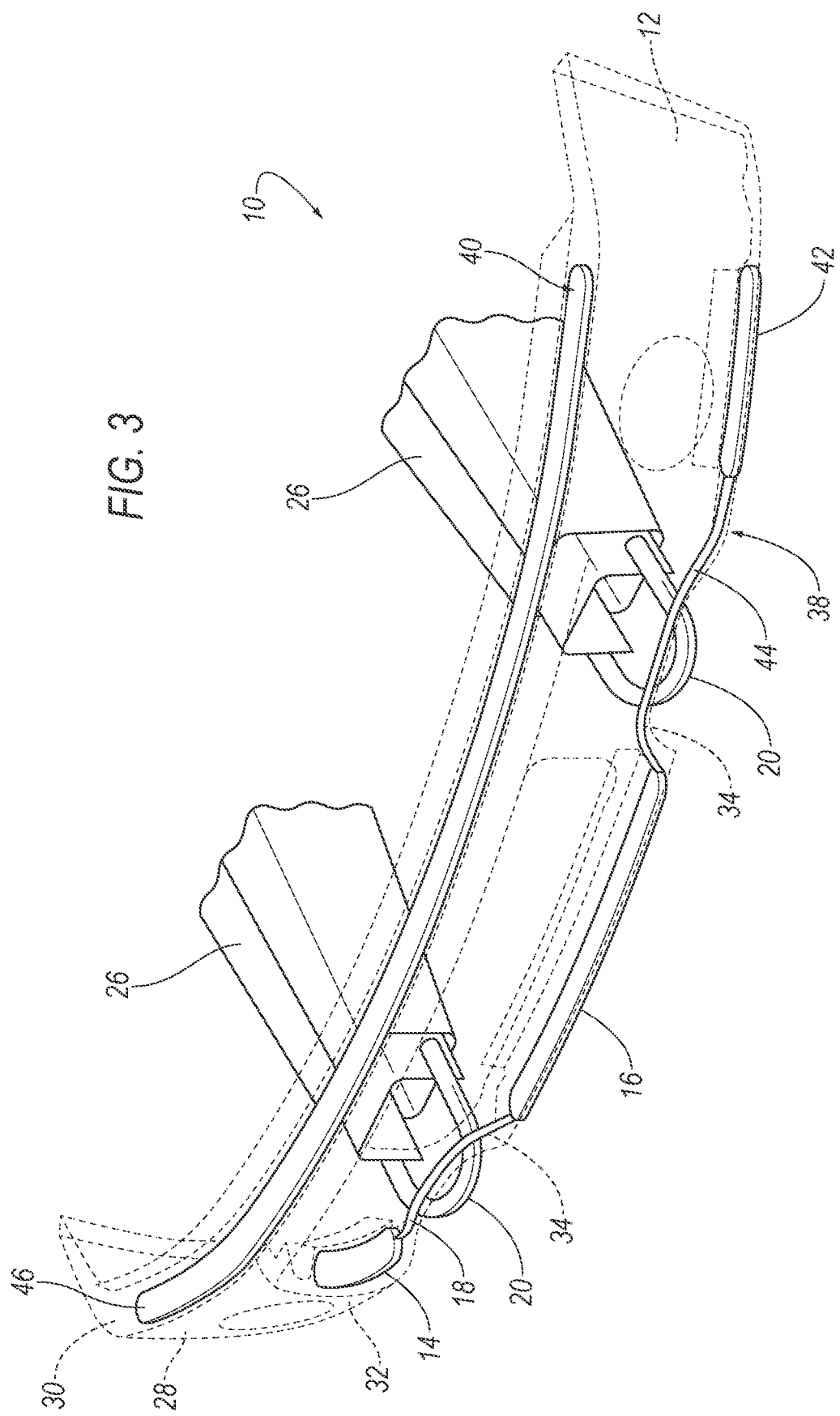
FIG. 3 is a perspective view of the bumper assembly with the inflatable devices in the undeployed positions.
Figure 4B:
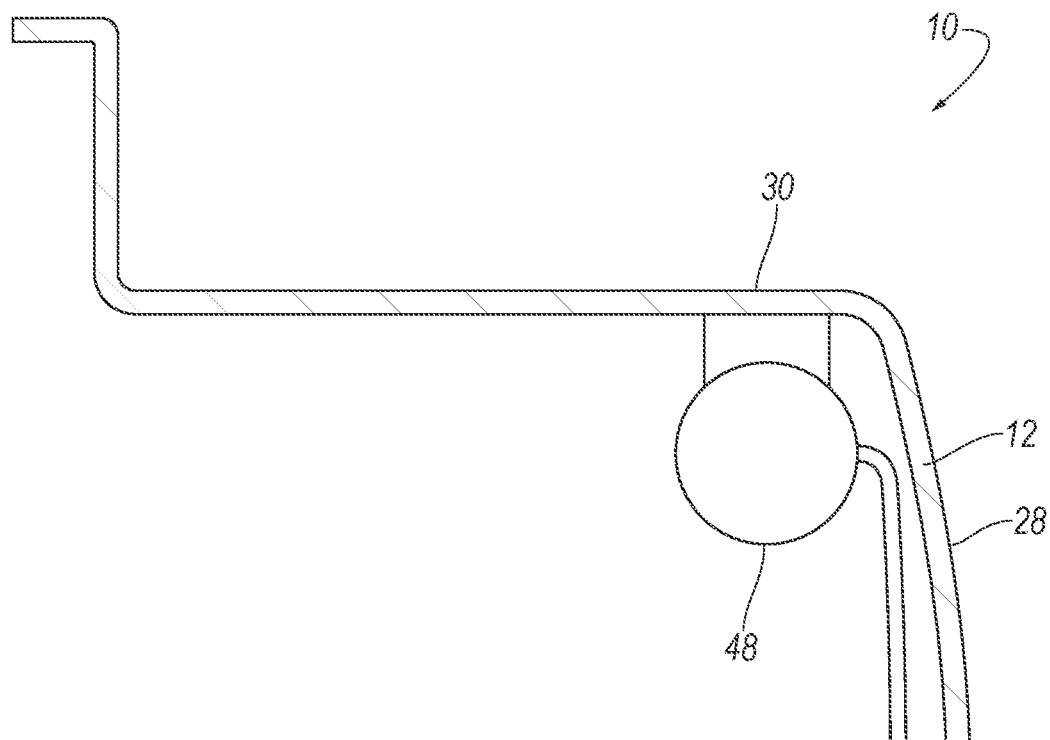
FIG. 4B is a cross-sectional view of the bumper assembly with a lower inflatable device in the undeployed position.
Figure 4C:
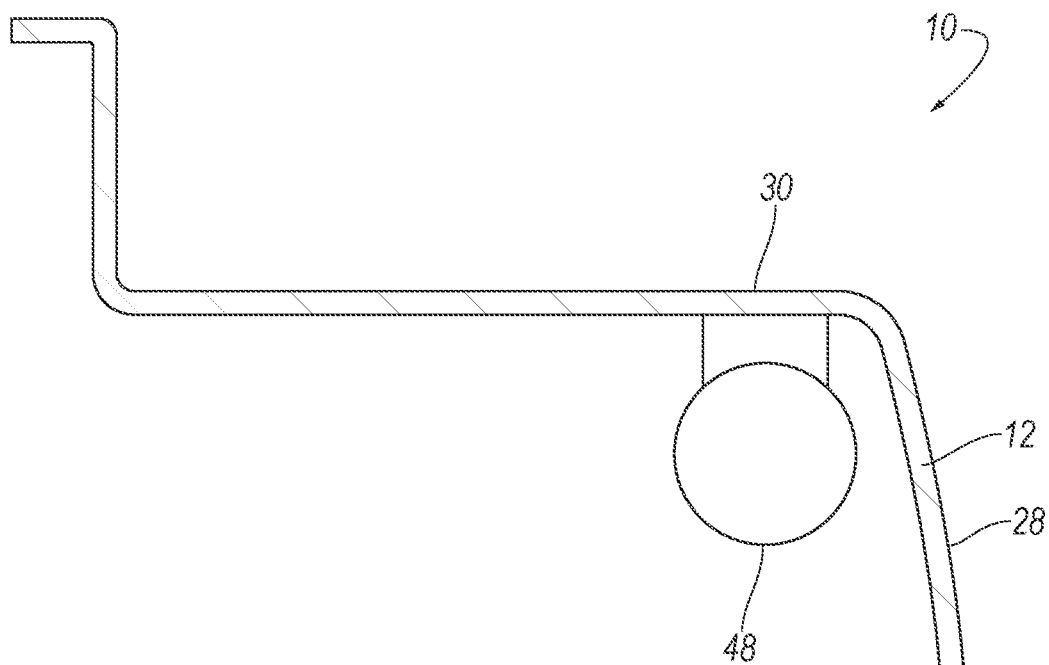
FIG. 4C is a cross-sectional view of the bumper assembly with the uninflatable panel in the undeployed position.
Figure 5:
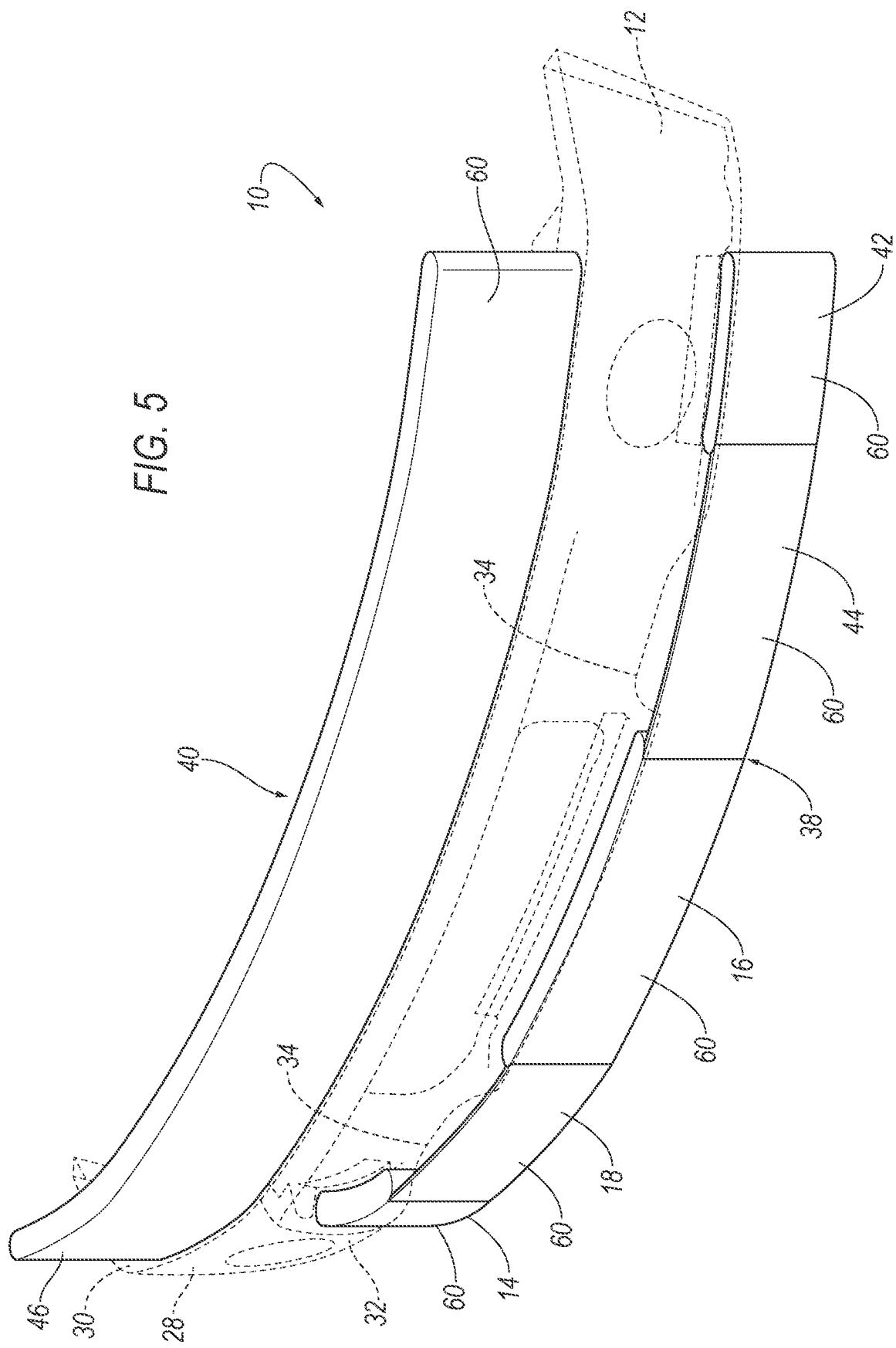
FIG. 5 is a perspective view of the bumper assembly with the inflatable devices in the deployed position.
Figure 6A:
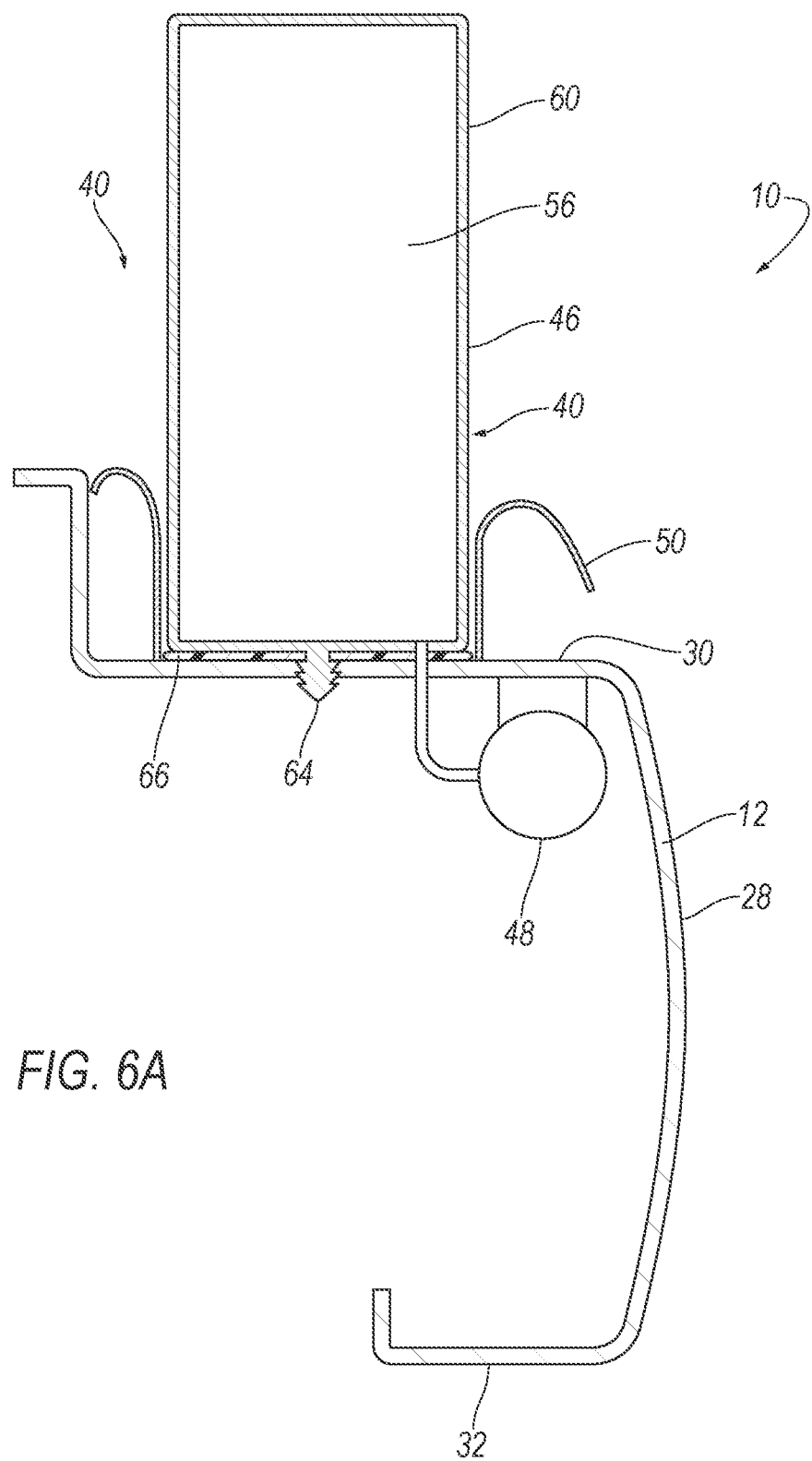
FIG. 6A is a cross-sectional view of the bumper assembly with the upper inflatable device in the deployed position.
Figure 6B:
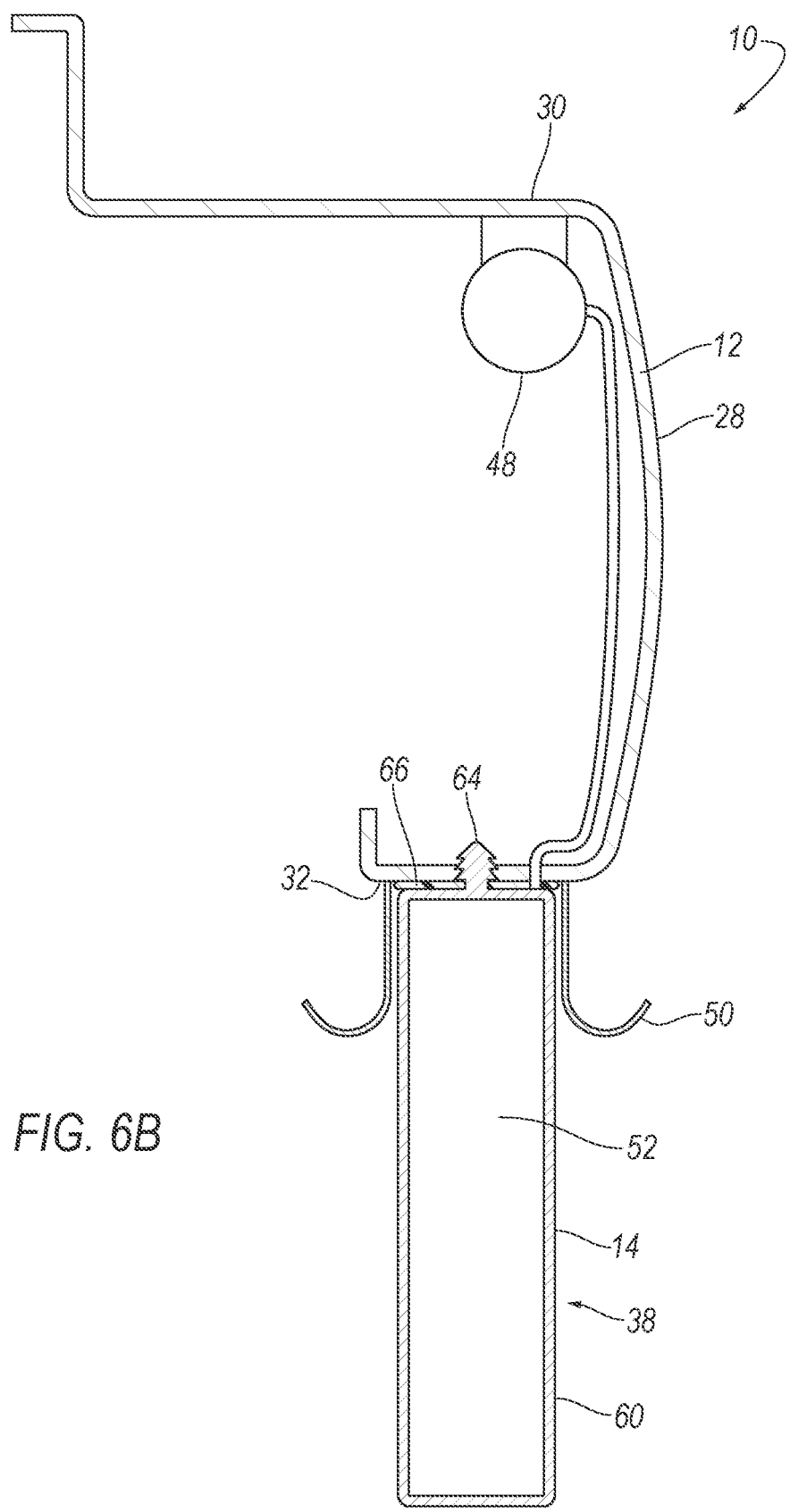
FIG. 6B is a cross-sectional view of the bumper assembly with the lower inflatable device in the deployed position.
Figure 6C:
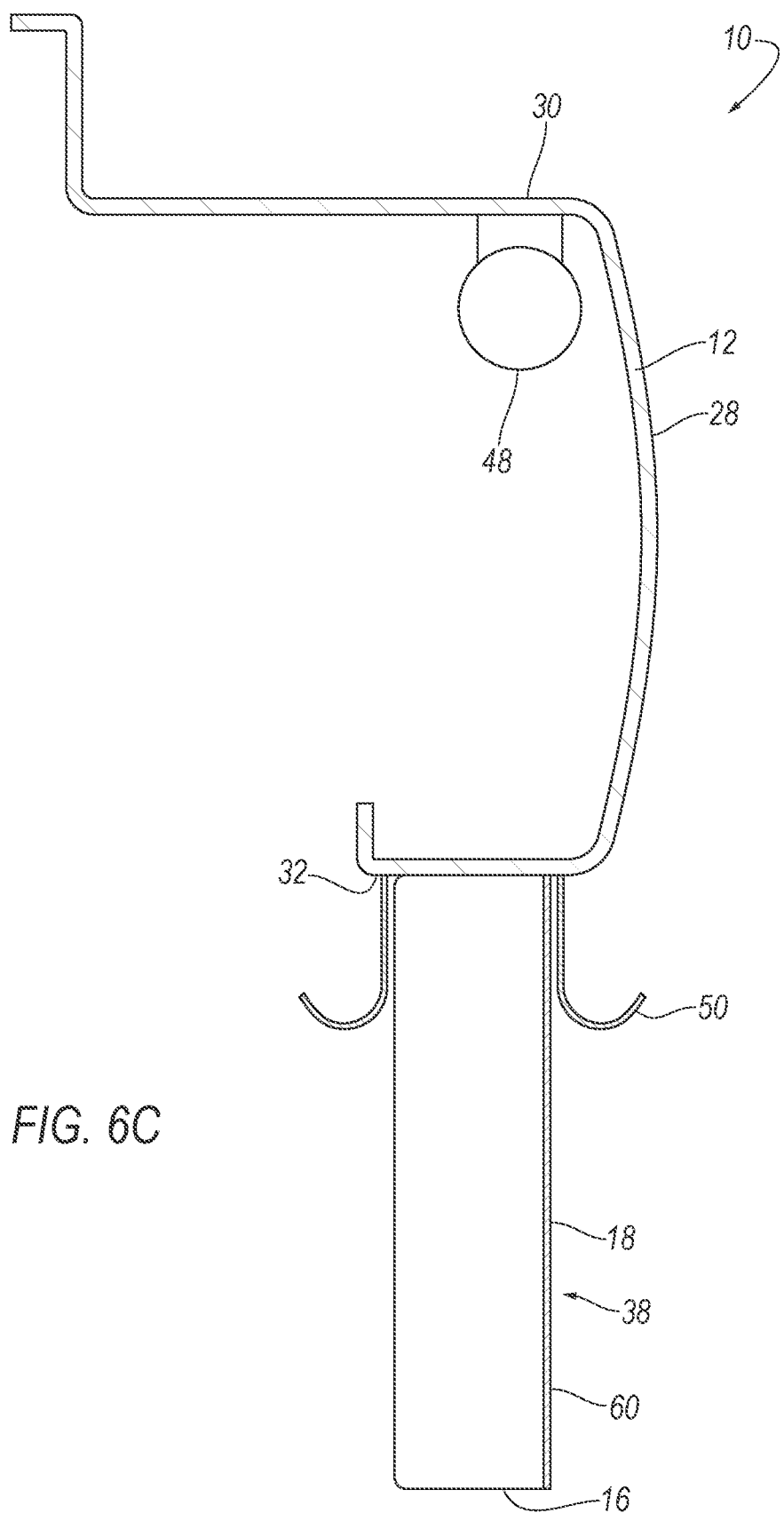
FIG. 6C is a cross-sectional view of the bumper assembly with the uninflatable panel in the deployed position.

With reference to FIGS. 1-2, the vehicle 24 may include one or more tow hooks 20 connected to the vehicle frame 58, e.g., the frame rail 26, at the front end of the vehicle 24. As an example, the tow hook 20 may be connected to a vehicle-forward end of the frame rail 26, e.g., by fastener, welding, etc. The vehicle 24 may include any suitable number of tow hooks 20. In examples including more than one tow hook 20, the tow hooks 20 may be identical. As an example, two tow hooks 20 are shown in the Figures and are identical to each other with common numerals identifying the common features. The vehicle 24 may include, for example, two tow hooks 20 at the front end of the vehicle 24, e.g., one tow hook 20 on each frame rail 26.

The tow hook 20 may be of any suitable shape. In one example, as shown in the Figures, the tow hook 20 may include an open loop. In other words, the tow hook 20 includes an opening that, for example, may receive a strap or chain of a towing vehicle 24. As another example, the tow hook 20 may include a closed loop, i.e., may include an enclosed ring that may receive a strap or chain of a towing vehicle 24.

The bumper 12 may include a tow-hook recess 34 for the tow hook 20. The tow-hook recess 34 may be sized to permit access to the tow hook 20. For example, in the example shown in the Figures, the tow-hook recesses 34 are on the bottom surface 32 of the bumper 12 and are recessed upwardly relative to the rest of the bottom surface 32. The tow hook 20 may be recessed vehicle-rearward of the bumper 12 in the tow-hook recess 34 or the tow hook 20 may extend from the frame vehicle-forward of the bumper 12 through the tow-hook recess 34. In examples including two tow hooks 20, the bumper 12 may include two tow-hook recesses 34, i.e., one tow hook 20 recess for each tow hook 20. In such examples, the tow hooks 20 and the tow-hook recesses 34 are spaced from each other along the vehicle-lateral axis A.

With reference to FIGS. 1-2, the vehicle 24 includes a grill 36 at the front end of the vehicle 24. The grill 36 is above the bumper assembly 10. The grill 36 may be spaced from the bumper assembly 10 or abutting the bumper assembly 10. The grill 36 may be a component of the vehicle body 22 and may be supported on other components of the vehicle body 22.

The bumper assembly 10 includes at least one deployable assembly. In the example shown in the Figures, the bumper assembly 10 includes two deployable assemblies 38, 40, namely a lower deployable assembly 38 and an upper deployable assembly 40. The deployable assembly 38, 40 includes the inflatable device 14, 16, 42, 46. The deployable assembly 38, 40 may have more than one inflatable device 14, 16, 42, 46 and at least one uninflatable panel 18, 44 extending from one inflatable device 14, 16, 42 to another inflatable device 14, 16, 42. Specifically, in the example shown in the Figures, the lower deployable assembly 38 includes three inflatable devices 14, 16, 42 and two uninflatable panels 14, 44, namely the first inflatable device 14, the second inflatable device 16, a third inflatable device 42, the uninflatable panel 18, and a second uninflatable panel 44. The deployable assembly 38, 40 may include only one inflatable device 46. For example, in the example shown in the Figures, the upper deployable assembly 40 includes an upper inflatable device 46. In such an example, the upper deployable assembly 40 does not include an uninflatable panel. The deployable assembly 38, 40 includes at least one inflator 48 to deploy the inflatable device 14, 16, 42, 46 as described further below.

The deployable assembly 38, 40 is supported by the bumper 12. In other words, the weight of the deployable assembly 38, 40 is borne by the bumper 12. The deployable assembly 38, 40 may be directly connected to the bumper 12, e.g., with fasteners 64 (described further below) such as threaded fasteners, push-pins, Christmas-tree fasteners, adhesive 66, etc., or indirectly connected to the bumper 12 through an intermediate component such as a bracket, fastener components, etc. By way of example, the deployable assemblies 38, 40 are shown attached with both adhesive 66 and Christmas-tree fasteners. As an example, the lower deployable assembly 38 may be supported on the bottom surface 32 of the bumper 12 and may be connected to the bottom surface 32. In such an example, the inflatable device 14, 16, 42, 46 and/or the uninflatable panel 18 may be connected to the bottom surface 32. The upper deployable assembly 40 may be supported on the top surface 30 of the bumper 12 and may be connected to the top surface 30.

In the undeployed position, the deployable assembly 38, 40 may be elongated along the vehicle-lateral axis A. Specifically, in the undeployed position the inflatable device 14, 16, 42, 46 may be elongated along the vehicle-lateral axis A. In examples including the uninflatable panel 18, e.g., the lower deployable assembly 38, the uninflatable panel 18 may be elongated along the vehicle-lateral axis A. In the undeployed position, the inflatable device 14, 16, 42, 46 may be rolled and/or folded on the bumper 12, e.g., on the top surface 30 or the bottom surface 32 as described above. For example, in the example shown in the Figures, the first inflatable device 14, the second inflatable device 16, and the third inflatable device 42 of the lower deployable assembly 38 are supported by the bumper 12 and are connected to the bumper 12, e.g., to the bottom surface 32 of the bumper 12, as shown in the example in the Figures. The upper inflatable device 46 of the upper deployable assembly 40 is supported by and connected to the bumper 12, e.g., to the top surface 30 of the bumper 12, as shown in the example in the Figures.

In the example shown in the Figures, the inflatable devices 14, 16, 42, 46 are connected directly to the bumper 12. In such an example, the deployable assembly 38, 40 may include a cover 50 that covers the inflatable devices 14, 16, 42, 46 and/or uninflatable panels 14, 44 on the bumper 12, as described further below. As another example, the deployable assemblies 38, 40 may include a housing (not numbered) connected to the bumper 12 and the inflatable device 14, 16, 42, 46 may be supported on the bumper 12 by the housing. In such an example, the housing houses the inflatable device 14, 16, 42, 46 in the undeployed position and supports the inflatable device 14, 16, 42, 46 in the deployed position. The inflatable device 14, 16, 42, 46 may be rolled and/or folded to fit within the housing in the undeployed position. The housing may be of any suitable material, e.g., a rigid polymer, a metal, a composite, or a combination of rigid materials. The housing may, for example, include clips, panels, etc. for attaching the inflatable device 14, 16, 42, 46 and for connecting the inflatable device 14, 16, 42, 46 assembly to the bumper 12.

The material of the inflatable device 14, 16, 42, 46 is a thermoplastic elastomer (TPE). Specifically, the inflatable device 14, 16, 42, 46 has walls that are thermoplastic elastomer. The walls of the inflatable device 14, 16, 42, 46 define an inflation chamber 52 expandable by inflation medium from the inflator 48, as described below. A thermoplastic elastomer has both thermoplastic and elastomeric properties. The inflatable device 14, 16, 42, 46 may be of any suitable TPE, e.g., styrenic block copolymers, thermoplastic olefins, elastomeric alloys, thermoplastic polyurethanes, thermoplastic copolyesters, and thermoplastic polyamides. The sides of the inflatable device 14, 16, 42, 46 are solid, i.e., not woven, not fabric, etc. The inflatable device 14, 16, 42, 46 may be formed using any suitable manufacturing process, e.g., injection molding, blow molding, ultrasonic welding, etc. A TPE may be manufactured with a class-A surface, e.g., the TPE may be textured in the molding process to match another class-A surface in the vehicle 24. In other words, when the inflatable device 14, 16, 42, 46 is a TPE, the inflatable device 14, 16, 42, 46 can be integrated into vehicle 24 components without an additional covering.

The inflatable device 14, 16, 42, 46 may be unitary. Specifically, the walls of the inflatable device 14, 16, 42, 46 may be unitary. In other words, the walls in combination are a single, uniform piece of material with no seams, joints, fasteners, or adhesives holding them to each other, i.e., the walls are formed together simultaneously as a single continuous unit. As another example, the walls may be non-unitary, i.e., formed separately and subsequently assembled, e.g., by adhesive, welding, overmolding, etc. As set forth above, the deployable assembly 38, 40 may be connected to the bumper 12 with fasteners 64. Specifically, the fasteners 64 may be unitary with one of the walls of the inflatable device 14, 16, 42, 46, as shown in the example shown in the Figures. Specifically, in the example shown in the Figures, the inflatable devices 14, 16, 42, 46 include Christmas-tree fasteners that are unitary with one of the walls.

In examples including the uninflatable panel 18, 44, e.g., the lower deployable assembly 38, the inflatable device(s) 14, 16, 42 and the uninflatable panel(s) 18, 44 may be unitary. As another example, the inflatable device(s) 14, 16, 42 and the uninflatable panel(s) 18, 44 may be formed separately and subsequently assembled, e.g., by adhesive, welding, overmolding, etc. In examples in which the inflatable device(s) 14, 16, 42 and the uninflatable panel(s) 18, 44 are unitary, the inflatable device(s) 14, 16, 42 and the uninflatable panel(s) 18, 44 may be of the same material type, e.g., TPE as described above. In other examples, the uninflatable panel(s) 18, 44 may be, for example, fabric, e.g., woven nylon.

The lower deployable assembly 38 includes inflatable devices 14, 16, 42 spaced cross-vehicle from each other. Specifically, the first inflatable device 14, the second inflatable device 16, and the third inflatable device 42 are spaced cross-vehicle from each other. In such an example, the inflatable devices 14, 16, 42 and the uninflatable panels 14, 44 are arranged in an alternating pattern along the bumper 12. In other words, in the vehicle-lateral axis A, the lower deployable assembly 38 includes one inflatable device 14, 16, 42, then one uninflatable panel 18, 44, then another inflatable panel 18, 44, then another uninflatable panel 18, 44, and so on.

In the example shown in the Figures in which the lower deployable assembly 38 includes three inflatable devices 14, 16, 42, one of the inflatable devices 14, 16, 42 (i.e., the second inflatable device 16 in the Figures) may be on a longitudinal midline of the bumper 12 in which case the other inflatable devices 14, 16, 42 are outboard on opposites sides thereof.

As set forth above, the bumper 12 includes two tow-hook recesses 34 in the example shown in the Figures. In the example shown in the Figures, one of the tow-hook recesses 34 may be between the first inflatable device 14 and the second inflatable device 16, and the other of the tow-hook recesses 34 may be between the third inflatable device 42 and the second inflatable device 16. In such an example, the uninflatable panel 18 is in one of the tow-hook recesses 34 and the second uninflatable panel 44 is in the other of the tow-hook recesses 34. As described further below, during downward deployment of the lower deployable assembly 38, the uninflatable panel 18 and the second uninflatable panel 44 extend across the tow-hook recesses 34, respectively. The uninflatable panel 18 and the second uninflatable panel 44 accommodate packaging restraints in the tow-hook recesses 34 when the lower deployable assembly 38 is in the undeployed position.

The deployable assembly 38, 40 is deployable away from the bumper 12. Specifically, the lower deployable assembly 38 is deployable downwardly from the undeployed position to the deployed position. In examples including the upper deployable assembly 40, the upper deployable assembly 40 is deployable upwardly from the undeployed position to the deployed position.

The inflatable device 14, 16, 42, 46 is deployable from the undeployed position, as shown in FIGS. 1, 3, 4A, 4B, and 4C to the deployed position, as shown in FIGS. 2, 5, 6A, 6B, and 6C. Specifically, the first inflatable device 14, the second inflatable device 16 and the third inflatable device 42 are deployable downwardly from the bumper 12 from the undeployed position to the deployed position. As another example, in examples including the upper inflatable device 46, the upper inflatable device 46 is deployable upwardly from the bumper 12 from the undeployed position to the deployed position.

The first inflatable device 14, the second inflatable device 16, and the third inflatable device 42 are underneath the upper inflatable device 46 in both the undeployed position and the deployed position. In the deployed position, the first inflatable device 14, the second inflatable device 16 and the third inflatable device 42 may extend below the bumper 12 relative to the vertical axis V. The upper inflatable device 46 in the deployed position may extend above the bumper 12. The upper inflatable device 46 may be vehicle-forward of the grill 36 and may cover 50 the grill 36 in the deployed position.

The uninflatable panel 18, 44, e.g., the uninflatable panel 18 and the second uninflatable panel 44, may be a panel of material that is not fixed to another panel, or itself, to enclose a volume for receiving inflation medium. The uninflatable panel 18, 44 is not in fluid communication with the inflation chambers 52 of the inflatable devices 14, 16, 42, 46. The uninflatable panel 18, 44 does not include a chamber inflatable by inflation medium. In other words, the uninflatable panel 18, 44 does not inflate.

The uninflatable panel 18 and the second uninflatable panel 44 are below the bumper 12. In the example shown in the Figures, the uninflatable panel 18 extends from the first inflatable device 14 to the second inflatable device 16, and the second uninflatable panel 44 extends from the second inflatable device 16 to the third inflatable device 42. The uninflatable panel 18 and the second uninflatable panel 44 extend downwardly from the bottom surface 32 in the deployed position to increase cross-vehicle coverage of the lower deployable assembly to control the kinematics of a pedestrian in the event of a pedestrian impact.

The uninflatable panel 18 may be supported by the inflatable device 14, 16, 42. In the example shown in the Figures, the uninflatable panel 18 may be supported on the first inflatable device 14 and the second inflatable device 16 in the deployed positions, and the second uninflatable panel 44 may be supported on the second inflatable device 16 and the third inflatable device 42 in the deployed positions. In other words, the weight of the uninflatable panel 18 is supported by the first inflatable device 14 and the second inflatable device 16 in the deployed positions, and the second uninflatable panel 44 is supported by the second uninflatable device 14 and the third uninflatable device 14 in the deployed positions. Specifically, the uninflatable panel 18 is directly connected to the first inflatable device 14 and the second inflatable device 16, and the second uninflatable panel 44 is directly connected to the second inflatable device 16 and the third inflatable device 42. The uninflatable panel 18 may be spaced from the bumper 12 in the deployed position and the second uninflatable panel 44 may be spaced from the bumper 12 in the deployed positions. The uninflatable panel 18 and the second uninflatable panel 44 may be connected to the bumper 12 in undeployed position. Specifically, the uninflatable panel 18 and the second uninflatable panel 44 may be directly or indirectly connected to the bumper 12, e.g., with fasteners 64 such as threaded fasteners, push-pins, Christmas-tree fasteners, adhesive 66, etc.

As set forth above, the uninflatable panel 18, 44 may be deployable across one of the tow-hook recesses 34 to the deployed position and the second uninflatable panel 44 may be deployable across the other tow-hook recess 34 to the deployed position. Specifically, the uninflatable panel 18 extends across one of the tow-hook recesses 34 and the second uninflatable panel 44 extends across the other of the tow-hook recesses 34. The uninflatable panel 18 and the second uninflatable panel 44 are packaged around the two tow-hook recesses 34 alleviating packaging constraints and accommodating the operation of the uninflatable panel 18 and second uninflatable panel 44 while also completing the cross-vehicle coverage for pedestrian impact.

As set forth above the bumper 12 has the front face 28. The lower inflatable assembly has front faces 60 horizontally aligned with the front face 28 of the bumper 12. Specifically, the first inflatable device 14, the second inflatable device 16, and the uninflatable panel 18 each have a face 60 horizontally aligned with the front face 28 of the bumper 12 in the deployed position. In examples including the third inflatable device 42, the third inflatable device 42 and the second uninflatable panel 44 also be horizontally aligned with the front face 28 of the bumper 12 in the deployed position, i.e., each have a face 60 horizontal aligned with the front face 28 of the bumper 12 in the deployed position. As another example, the upper inflatable assembly may be horizontally aligned with the front face 28 of the bumper 12. Specifically, the upper inflatable device 46 has a front face 60 that may be horizontally aligned with the front face 28 of the bumper 12 in the deployed position. The horizontal alignment of the inflatable devices 14, 16, 42, 46 and uninflatable panels 14, 44 with the front face 28 of the bumper 12 distributes load across the leg of a pedestrian in the event of a pedestrian impact.

The deployable assembly 38, 40 may include a cover 50 supported by the bumper 12 and covering the inflatable device 14, 16, 42, 46 and or uninflatable panel 18. In some examples, the lower deployable assembly 38 may include one cover 50 that covers each of the first inflatable device 14, the second inflatable device 16, the third inflatable device 42, the uninflatable panel 18, and the second uninflatable panel 44. In other examples, the lower deployable assembly 38 may include more than one cover 50 each dedicated to one or a combination of less than all of the inflatable devices 14, 16, 42, 46 and uninflatable panels 14, 44. The cover 50 may be connected to the bumper 12, for example, with adhesive, fasteners, etc. The inflatable devices 14, 16, 42, 46 and uninflatable panels 14, 44 may be rolled or otherwise packaged in the undeployed position and may break from the cover 50 to the deployed position.

The cover 50 may include a tear seam. For example, the tear seam may extend along the vehicle-lateral axis A. The tear seam may be designed such that the inflatable device 14, 16, 42, 46 breaks through and extend through the tear seam in the deployed position. The tear seam may be, for example, a line of perforations through the cover 50, a line of thinner cover 50 material than the rest of the cover 50, etc.

The bumper assembly 10 includes at least one inflator 48 to deploy the first inflatable device 14, the second inflatable device 16, the third inflatable device 42 and the upper inflatable device 46. In one example, the lower deployable assembly 38 may include one inflator 48 and the upper inflatable assembly may include a separate inflator 48. In other examples, two or more of the first inflatable device 14, the second inflatable device 16, the third inflatable device 42 and the upper inflatable device 46 may share a common inflator 48. In such examples, the common inflator 48 may be fluidly connected to multiple ones of the first inflatable device 14, the second inflatable device 16, the third inflatable device 42, and/or the upper inflatable device 46, for example, through separate fill tubes.

The inflator 48 may be directly or indirectly connected to the bumper 12, e.g., with fasteners 64 such as threaded fasteners, push-pins, Christmas-tree fasteners, etc. The inflator 48 may be connected to the vehicle body 22. The inflator 48 may be vehicle-rearward of the bumper 12 between the top surface 30 and the bottom surface 32.

The inflator 48 expands the inflatable device 14, 16, 42, 46 with inflation medium, such as a gas, to move the inflatable device 14, 16, 42, 46 from the undeployed position to the deployed position. Specifically, the inflator 48 inflates the inflation chamber 52 of the inflatable device 14, 16, 42, 46. The inflator 48 may be, for example, a pyrotechnic inflator 48 that ignites a chemical reaction to generate the inflation medium, a stored gas inflator 48 that releases (e.g., by a pyrotechnic valve) stored gas as the inflation medium, or a hybrid.

Figure 7:
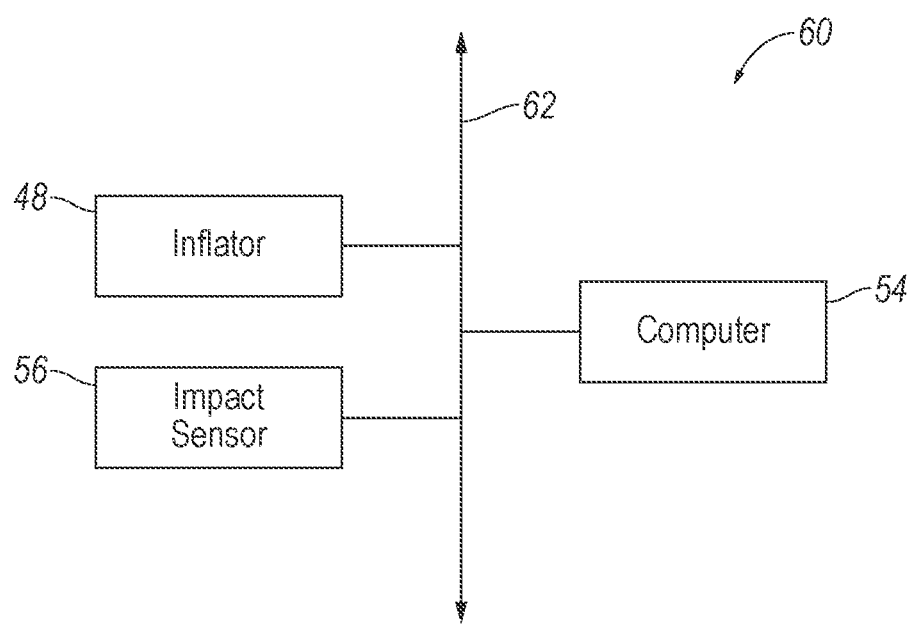
FIG. 7 is a block diagram of a system of the vehicle.

With reference to FIG. 7, the vehicle 24 includes a computer 54 that controls the deployment of the deployable assemblies 38, 40. The computer 54 may be, for example, a restraints control module The computer 54 includes a processor and a memory. The memory includes one or more forms of computer 54 readable media, and stores instructions executable by the processor for performing various operations, including as disclosed herein. For example, the computer 54 can be a generic computer 54 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 54 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 54. The memory can be of any type, e.g., hard disk drives, solid state drives, servers, or any volatile or non-volatile media. The memory can store the collected data sent from the sensors. The memory can be a separate device from the computer 54, and the computer 54 can retrieve information stored by the memory via a network in the vehicle 24, e.g., over a CAN bus, a wireless network, etc.

As set forth above, the vehicle 24 may include at least one impact sensor 56. The impact sensor 56 is in communication with the computer 54. The impact sensor 56 senses impact, e.g., pedestrian impact, and the computer 54 controls deployment of the deployable assemblies 38, 40 in response to detected impact, for sensing impact of the vehicle 24. The impact sensor 56 is configured to sense impact during or prior to impact, i.e., pre impact sensing. The impact sensor 56 may be of any suitable type, for example, post contact sensors such as accelerometers, pressure sensors, and contact switches; and pre impact sensors 56 such as radar, LIDAR, and vision sensing systems. The vision sensing systems may include one or more cameras, CCD image sensors, CMOS image sensors, etc.

The vehicle 24 includes a communication network 62. The communication network 62 can include a bus in the vehicle such as a controller area network (CAN) or the like, and/or other wired and/or wireless mechanisms. Via the vehicle network, the computer 54 may transmit messages to various devices in the vehicle and/or receive messages (e.g., CAN messages) from the various devices, e.g., sensors, an actuator, a human machine interface (HMI), etc. Various controllers and/or sensors, including the impact sensors 56 may provide data to the computer 54 via the vehicle communication network 62.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly comprising:
a vehicle bumper;
a first inflatable device supported by the vehicle bumper and inflatable downwardly from the vehicle bumper from an undeployed position to a deployed position, the first inflatable device defining an inflation chamber and being a thermoplastic elastomer;
a second inflatable device supported by the vehicle bumper spaced cross-vehicle from the first inflatable device, the second inflatable device being inflatable downwardly from the vehicle bumper from an undeployed position to a deployed position, the second inflatable device defining an inflation chamber and being a thermoplastic elastomer; and
an uninflatable panel below the vehicle bumper and deployable downwardly relative to the vehicle bumper from an undeployed position to a deployed position, the uninflatable panel extending from the first inflatable device to the second inflatable device when the first inflatable device, the second inflatable device, and the uninflatable panel are in the deployed positions.

2. The bumper assembly of claim 1, further comprising an upper inflatable device supported by the vehicle bumper, the upper inflatable device defining an inflation chamber and being a thermoplastic elastomer.

3. The bumper assembly of claim 2, wherein the upper inflatable device is inflatable upwardly from the vehicle bumper from an undeployed position to a deployed position.

4. The bumper assembly of claim 2, further comprising an inflator fluidly connected to the first inflatable device, the second inflatable device, and the upper inflatable device.

5. The bumper assembly of claim 2, wherein the vehicle bumper has a top surface and a bottom surface, the first inflatable device and the second inflatable device inflate downwardly from the bottom surface and the upper inflatable device inflates upwardly from the top surface.

6. The bumper assembly of claim 2, wherein the first inflatable device and the second inflatable device are underneath the upper inflatable device when the first inflatable device, the second inflatable device, and the upper inflatable device are in deployed positions.

7. The bumper assembly of claim 2, wherein the vehicle bumper has a front face and the first inflatable device, the second inflatable device, and the upper inflatable device each have a front face horizontally aligned with the front face of the vehicle bumper in the deployed position.

8. The bumper assembly of claim 1, wherein the uninflatable panel extends in the cross-vehicle direction from the first inflatable device to the second inflatable device when the first inflatable device and the second inflatable device are in the deployed position.

9. The bumper assembly of claim 1, wherein the vehicle bumper includes a bottom surface, the first inflatable device and the second inflatable device being inflatable downwardly from the bottom surface.

10. The bumper assembly of claim 1, further comprising a cover supported by the vehicle bumper, the first inflatable device, the second inflatable device, and the uninflatable panel being between the cover and the vehicle bumper in the undeployed position.

11. The bumper assembly of claim 1, further comprising an inflator fluidly connected to the first inflatable device and the second inflatable device.

12. The bumper assembly of claim 1, wherein the uninflatable panel is connected to the first inflatable device and the second inflatable device.

13. The bumper assembly of claim 1, further comprising a third inflatable device supported by the vehicle bumper spaced cross-vehicle from the first inflatable device and the second inflatable device, the third inflatable device being inflatable downwardly from the vehicle bumper from an undeployed position to a deployed position.

14. The bumper assembly of claim 13, further comprising a second uninflatable panel below the vehicle bumper and extending from the second inflatable device to the third inflatable device in the deployed positions, the second inflatable device being between the first inflatable device and the third inflatable device.

15. The bumper assembly of claim 14, wherein the vehicle bumper includes two tow-hook recesses, the uninflatable panel being deployable across one of the tow-hook recesses to the deployed position and the second uninflatable panel being deployable across the other tow hook recess to the deployed position.

16. The bumper assembly of claim 15, wherein the second inflatable device is on a lateral midline of the vehicle bumper, one of the tow-hook recesses is between the first inflatable device and the second inflatable device, and the other of the tow-hook recesses is between the third inflatable device and the second inflatable device.

17. The bumper assembly of claim 1, wherein the uninflatable panel is connected to the vehicle bumper in the undeployed position.

18. The bumper assembly of claim 1, wherein the vehicle bumper includes a tow hook recess, the uninflatable panel being deployable across the tow hook recess to the deployed position.

19. A bumper assembly comprising:
a vehicle bumper including a tow hook recess;
a first inflatable device supported by the vehicle bumper and inflatable downwardly from the vehicle bumper from an undeployed position to a deployed position, the first inflatable device defining an inflation chamber and being a thermoplastic elastomer;
a second inflatable device supported by the vehicle bumper spaced cross-vehicle from the first inflatable device, the second inflatable device being inflatable downwardly from the vehicle bumper from an undeployed position to a deployed position, the second inflatable device defining an inflation chamber and being a thermoplastic elastomer; and
an uninflatable panel below the vehicle bumper and being deployable across the tow hook recess to a deployed position, the uninflatable panel extending from the first inflatable device to the second inflatable device in the deployed position.

20. A bumper assembly comprising:
a vehicle bumper including a tow hook recess;
a first inflatable device supported by the vehicle bumper and inflatable downwardly from the vehicle bumper from an undeployed position to a deployed position, the first inflatable device defining an inflation chamber and being a thermoplastic elastomer;
a second inflatable device supported by the vehicle bumper spaced cross-vehicle from the first inflatable device, the second inflatable device being inflatable downwardly from the vehicle bumper from an undeployed position to a deployed position, the second inflatable device defining an inflation chamber and being a thermoplastic elastomer;
an uninflatable panel below the vehicle bumper and extending from the first inflatable device to the second inflatable device in the deployed positions; and
a cover supported by the vehicle bumper, the first inflatable device, the second inflatable device, and the uninflatable panel being between the cover and the vehicle bumper in the undeployed position.

\* \* \* \* \*